United States Patent [19]

Garcia

[11] Patent Number: 5,614,047
[45] Date of Patent: Mar. 25, 1997

[54] METHOD OF MANUFACTURING PAINT ROLLERS

[76] Inventor: Jaime A. Garcia, Ronda Santa Maria, 3-7 Barbera Del Valles, Barcelona, Spain

[21] Appl. No.: 902,483

[22] Filed: Jun. 23, 1992

Related U.S. Application Data

[63] Continuation of Ser. No. 656,102, Feb. 11, 1991, abandoned, which is a continuation of Ser. No. 325,101, Mar. 13, 1989, abandoned, which is a continuation of Ser. No. 65,382, Jul. 28, 1987, abandoned, which is a division of Ser. No. 807,818, Dec. 11, 1985, Pat. No. 4,692,975.

[51] Int. Cl.$^6$ ................................................. B32B 31/00
[52] U.S. Cl. .................. 156/187; 156/172; 156/309.6
[58] Field of Search ............................ 156/187, 188, 156/195, 309.6, 149, 172

[56] References Cited

U.S. PATENT DOCUMENTS 2,700,631  1/1955  Ferguson ....................... 156/187
2,810,424  10/1957  Swartswelter ....................... 156/187
2,812,007  11/1957  Touchett et al. ....................... 156/182
3,401,073  9/1968  Wood ....................... 156/187
3,616,070  10/1971  Lemelson ....................... 156/446
3,633,629  1/1972  Rider ....................... 156/172
3,736,202  5/1973  Sorenson ....................... 156/309.6
4,078,957  3/1978  Bradt ....................... 242/7.22 X

FOREIGN PATENT DOCUMENTS 0069335  1/1983  European Pat. Off. .
2093060  1/1972  France ....................... 156/195

Primary Examiner—James Engel
Attorney, Agent, or Firm—Baker & Mckenzie

[57] ABSTRACT

A paint roller is comprised of a thermoplastic tubular core and a cover fabric heat-fused thereto without an intermediate adhesive. The fabric is wound around the core in a helical path, and the core is heat-softened in the zone of winding to fuse the fabric to the core as it is wound thereon.

2 Claims, 3 Drawing Sheets

METHOD OF MANUFACTURING PAINT ROLLERS

This application is a continuation of application Ser. No. 656,102, filed Feb. 11, 1991, now abandoned, which in turn was a continuation of Ser. No. 325,101, filed Mar. 13, 1989, now abandoned, which in turn was a continuation of Ser. No. 065,382, filed Jul. 28, 1987, now abandoned, which in turn was a division of Ser. No. 807,818, now U.S. Pat. No. 4,692,975.

BACKGROUND OF THE INVENTION

1. Field of the Invention

The present invention relates to a novel construction, and a method and apparatus for the manufacture thereof, for a paint roller comprised of a tubular thermoplastic core and a fabric cover. In accordance with the invention, the fabric cover is wound helically (in spiral form) over the plastic core and the fabric cover and the plastic core are forged together, to form an integral body, by applying heat to the core.

2. Background of the Invention

In the manufacture of paint rollers as presently practiced, a tubular plastic or cardboard core is inserted lengthwise over a rotating cylinder or spindle. The fabric cover, in the form of a tape or strip, is wound over the tubular core in a helical manner. This is done by feeding the fabric strip over the core from a guide oriented obliquely to the axis of the core and moving the guide lengthwise of the core in timed relation to the speed of rotation of the spindle. An adhesive is used to adhere the fabric strip to the core, and this type of device therefore requires both a supply of adhesive and apparatus for applying the adhesive material in the proper amounts to the fabric and/or the core.

The bonding of the fabric to the tubular core by use of an adhesive presents several manufacturing problems resulting from the difficulty of consistently applying the adhesive in proper doses. Also, a special adhesive must be used to produce the desired bond between the core and the fabric. These disadvantages considerably increase the cost and complexity of manufacture of the paint rollers.

SUMMARY OF THE INVENTION

It is an object of the present invention, therefore, to provide a novel paint roller construction, and a method and apparatus for the manufacture thereof, that permits bonding of the fabric strip to the tubular core without the use of adhesives and the components required for the supply and measuring thereof.

A further object of the invention is to provide a novel paint roller construction in which the fabric cover is heat bonded to a tubular thermoplastic core without requiring a separate adhesive material.

Still a further object of the invention is to provide a novel paint roller construction, and a method and apparatus for the manufacture thereof, in which the fabric cover is integrally bonded to a tubular plastic core by heat-softening the core to fuse the cover thereto, to form a single unitary body.

These and other objects of the invention are attained by winding the fabric cover strip over a tubular thermoplastic core and by fusing the fabric directly to the core, without the use of an adhesive, by applying heat to the core in the zone where the fabric is wound thereon. Preferably, the heat source is located parallel to the plastic core in the region immediately forward of the point where the fabric is fed over the core. The fabric is supplied to the core along a guide oriented obliquely to the core axis to wind the fabric over the axis in a helical path.

BRIEF DESCRIPTION OF THE DRAWINGS

For a better understanding of the invention, reference may be made to the following description of illustrative embodiments thereof and to the accompanying drawings, in which.

DETAILED DESCRIPTION OF THE INVENTION

Figure 1:
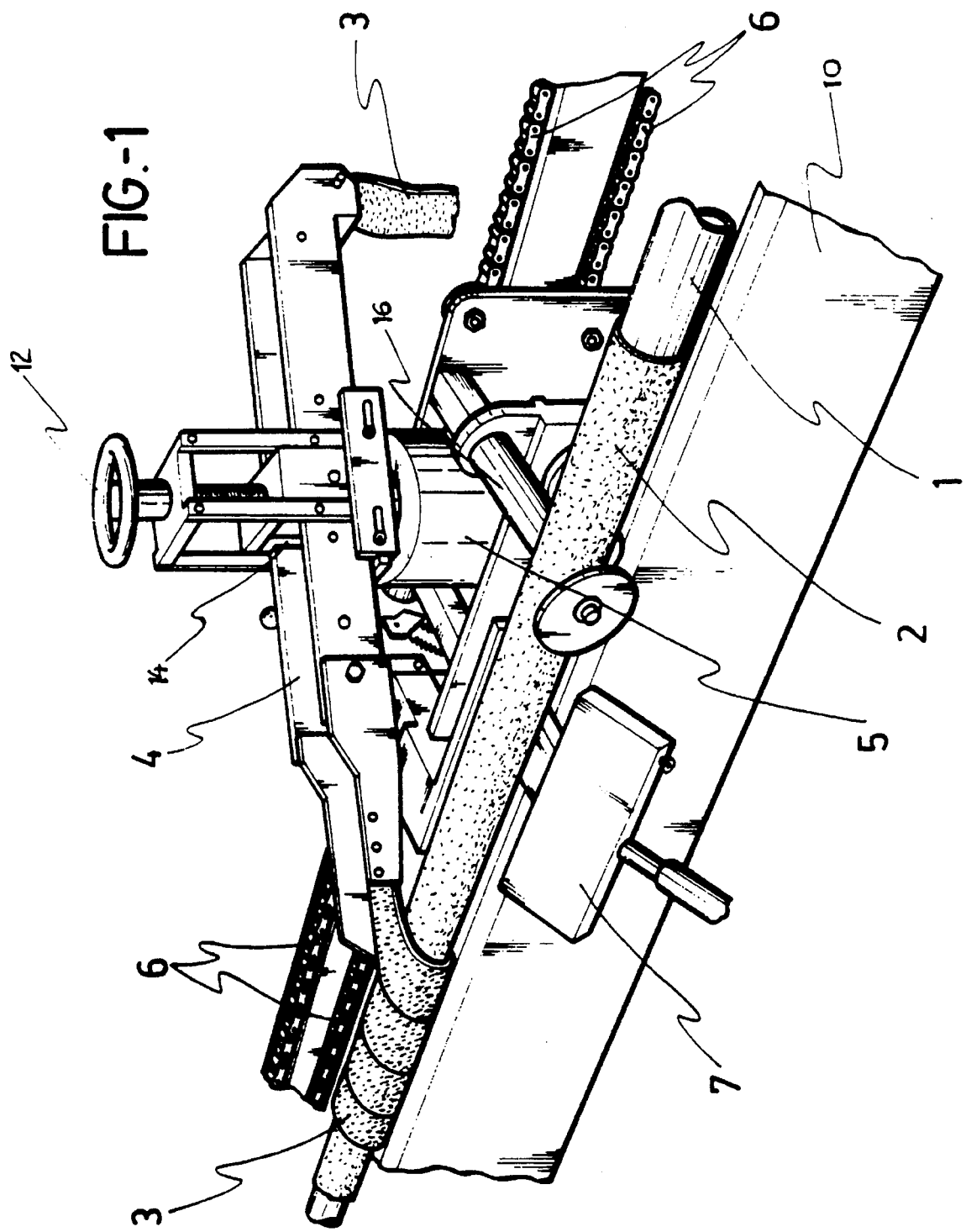
FIG. 1 is a perspective view of one embodiment of an apparatus for manufacture of the novel paint roller of the present invention.
Figure 2:
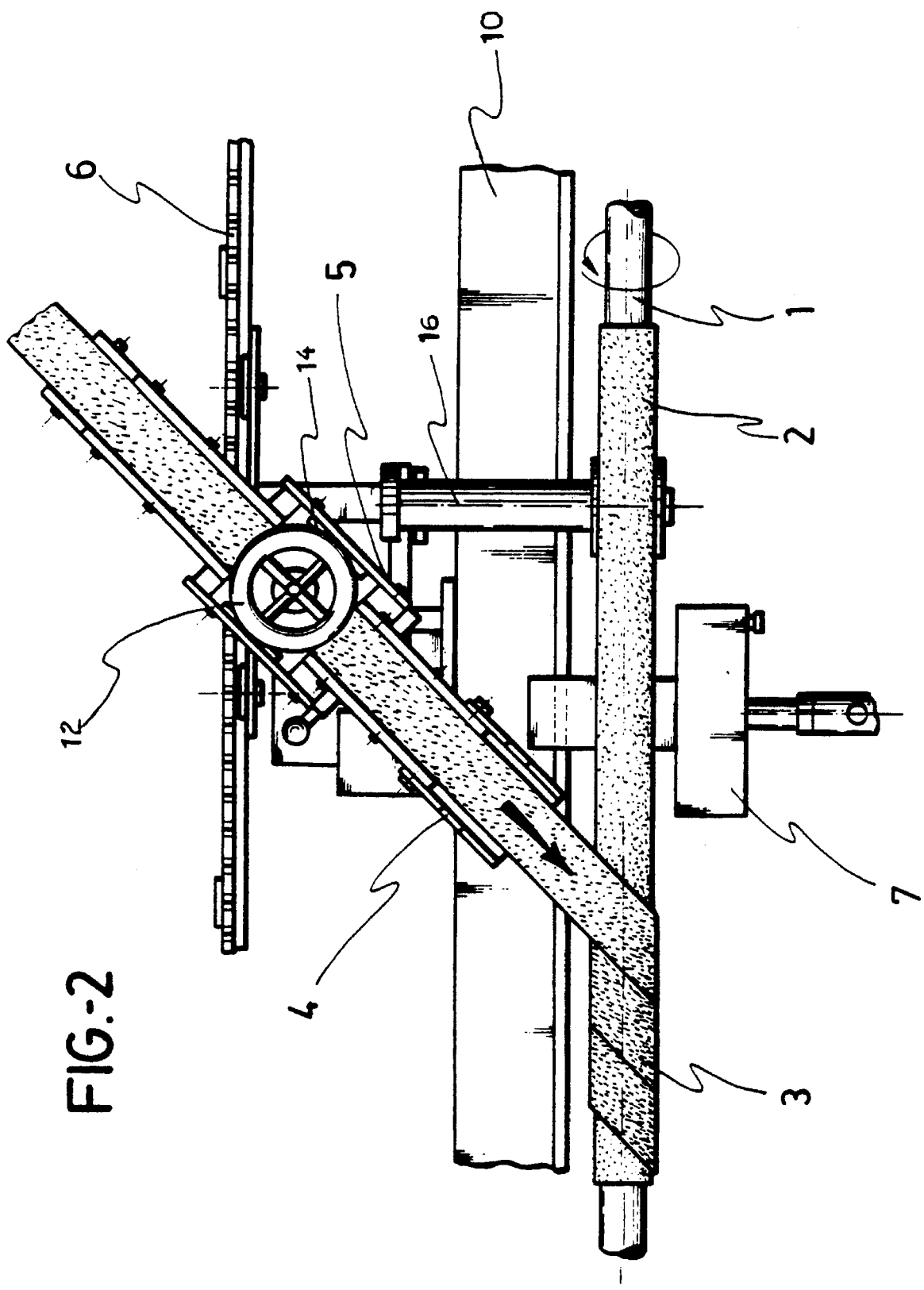
FIG. 2 is a plan view of the apparatus of FIG. 1.
Figure 3:
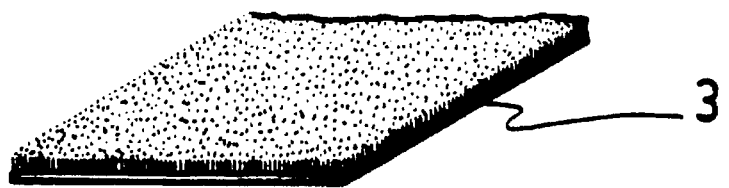
FIG. 3 is a perspective view of a section of the fabric strip used in fabricating the paint roller of the invention.
Figure 4:
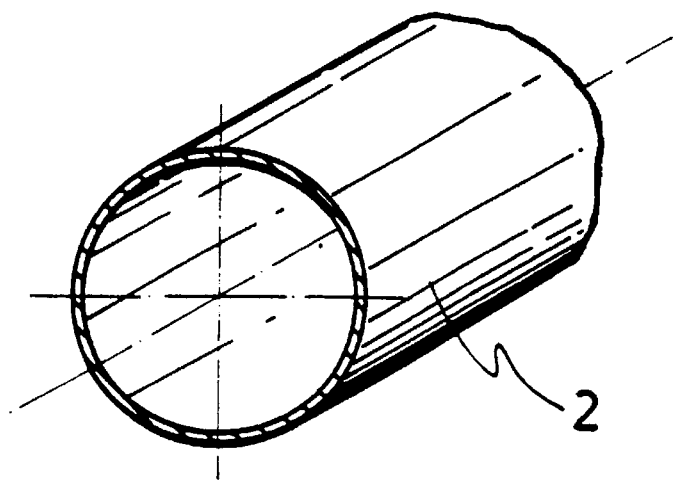
FIG. 4 is a perspective view of a section of a plastic tubular core used in fabricating the paint roller of the invention.

In the embodiment of the apparatus illustrated in FIGS. 1 and 2, a length of plastic tubular core stock 2 is inserted lengthwise over a spindle or cylinder 1. The plastic stock preferably comprises polypropylene, but may be made of any suitable thermoplastic material having the desired heat-bonding characteristics. As indicated in FIG. 2, the cylinder 1 is rotated (by a conventional means not shown) in the counterclockwise direction so as to wind around the core 2 a fabric strip 3. The fabric material is shown in more detail in FIG. 3, and is in fact a conventional cover material for a paint roller.

The fabric strip 3 is fed to the core 2 by a guide 4 that is adjustably mounted on a carriage 5 so as to be oriented at an angle to the axis of the cylinder 1. The carriage 5 is moved parallel to the cylinder 1 along a frame 10, on which it is movably supported in a conventional manner. The movement of the carriage 5 is controlled by a chain drive 6. The speed of movement of the carriage 5 is timed relative to the speed of rotation of the cylinder 1 so that the fabric strip 3 is wound on the plastic core 2 in a tight helix.

The fabric strip 3 is fed to the guide from a supply (not shown) and preferably is of a standard width and thickness, as is known in the art. If desired, the walls of the guide 4 may be made adjustable to accommodate strips of different widths. A hand wheel 12 is connected via a threaded shaft to a pressure pad 14 to apply a desired amount of pressure to the strip 3. This pressure serves to maintain the strip 3 under tension (in the direction of the arrow in FIG. 1), so that the strip will be wound tightly on the core 2. The carriage also includes a roller guide 16 which maintains the cylinder 1 and core 2 in the proper positional relationship to the guide 4.

As a feature of the invention, no adhesive is used to bond the fabric strip 3 to the core 2. Instead, a heat source 7 is positioned to soften the surface of the core 2 just in advance of the zone of winding of the strip on the core. The heat source 7 is preferably somewhat elongated in the direction of the axis of the core 2, and suitably comprises a manifold-like structure for directing a series of flame jets against the surface of the core. Any suitable fuel may be used, such as, for example, natural gas. Alternatively, the heat source 7 may comprise an electrical, optical, or other type energy source. The heat source 7 is mounted on the carriage 5 for movement therewith along the length of the core 2. In this way, the surface of the core 2 in the zone of winding is heat-softened to the point that the fabric strip 3 is fused thereto upon being wound over the core 2. The resulting structure 8, illustrated in FIG. 5, is a paint roller in which the fabric strip and the plastic core have in effect been fused into an integral unitary body.

Figure 5:
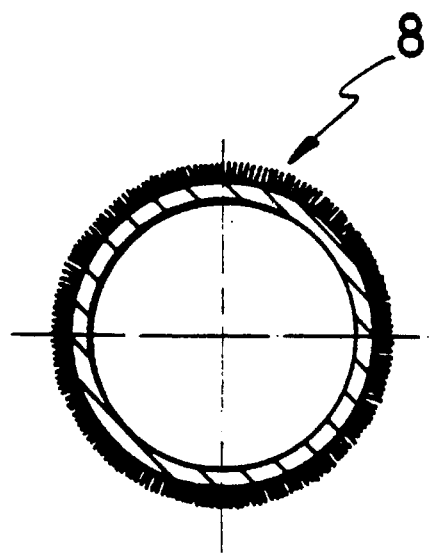
FIG. 5 is a transverse sectional view of the paint roller of the invention, showing the integral forging of the fabric cover to the plastic core to form a unitary paint roller structure.

The paint roller 8 of FIG. 5 may be used as a replacement element or it may be provided with end pieces and a handle to form a complete roller assembly.

The present invention thus affords a simple low cost method and apparatus of manufacture that obviates the aforementioned problems of the prior art adhesive technique. The method and apparatus may therefore be readily set up and practiced with only a comparatively small investment in facilities and in personnel training. Also, the paint roller of the invention is a lightweight, strong and very clean end product that is free of the adhesive-related defects found in prior art paint rollers.

Although the invention has been described and illustrated herein by reference to specific embodiments thereof, it will be understood that such embodiments are susceptible of modification and variation without departing from the inventive concepts disclosed. All such modifications and variations, therefore, are intended to be included within the spirit and scope of the appended claims.

I claim:

1. A cold core method of making a paint roller from a cold, hard, preformed hollow core of thermoplastic material of a predetermined length in which the cold hard hollow core and its associated fabric cover are forged together to form a single unitary body comprising the steps of providing a hard hollow core, said hard hollow core being cold, said cold hard hollow core being composed of a thermoplastic material capable of being fused to a fabric cover of a compatible material to form a single unitary body, said cold hard hollow core further having a predetermined, finite length, providing a mandrel having an external diameter which slidably receives and makes contact with the cold hard hollow core throughout its length so as to thereby enable the cold hard hollow core to rotate with the mandrel, rotating the mandrel and thereby the cold hard hollow core which has been received thereon and is in contact therewith, heating, by application of a single source of heat, the exterior surface of the cold hard hollow thermoplastic rotating core to a temperature high enough to cause subsequently applied fabric to adhere to said exterior surface, applying a fabric to the heated exterior of the hard hollow thermoplastic rotating core bonding the fabric to the heated exterior surface of the hard hollow thermoplastic core.

2. The method of claim 1 further characterized by and including the step of applying pressure to the unheated fabric as the fabric is applied to the heated exterior of the code hard hollow thermoplastic core.

* * * * *